(12) United States Patent
Chen et al.

(10) Patent No.: US 12,103,010 B1
(45) Date of Patent: Oct. 1, 2024

(54) MEDICAL WASTE TREATMENT MACHINE WITH ANTI-CLOGGING FUNCTION

(71) Applicant: ZHEJIANG WEIDUN ENVIRONMENTAL TECHNOLOGY CO., LTD., Hangzhou (CN)

(72) Inventors: Yiming Chen, Hangzhou (CN); Weixing Chen, Hangzhou (CN); Junfeng Liu, Hangzhou (CN); Guanzhong Huang, Hangzhou (CN)

(73) Assignee: ZHEJIANG WEIDUN ENVIRONMENTAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/672,402

(22) Filed: May 23, 2024

Related U.S. Application Data

(63) Continuation of application No. PCT/CN2022/140942, filed on Dec. 22, 2022.

(30) Foreign Application Priority Data

Nov. 23, 2021 (CN) .......................... 202111395770.7

(51) Int. Cl.
*B02C 18/18* (2006.01)
*B02C 18/16* (2006.01)
(Continued)

(52) U.S. Cl.
CPC ................ *B02C 18/16* (2013.01); *B09B 3/35* (2022.01); *B02C 2018/162* (2013.01); *B02C 2018/164* (2013.01); *B09B 2101/65* (2022.01)

(58) Field of Classification Search
CPC . B02C 19/0075; B02C 18/18; B02C 18/0092; B02C 18/0084; B02C 18/12;
(Continued)

(56) References Cited

U.S. PATENT DOCUMENTS 4,171,103 A * 10/1979 Rossler ............... B02C 18/2275
241/257.1
4,949,916 A * 8/1990 Wroblewski ........ B02C 18/0084
241/261.1
(Continued)

FOREIGN PATENT DOCUMENTS

CN 111719645 A * 9/2020 ............ E03C 1/266
CN 211679275 U 10/2020
(Continued)

*Primary Examiner* — Faye Francis
(74) *Attorney, Agent, or Firm* — Westbridge IP LLC

(57) ABSTRACT

A medical waste treatment machine with anti-clogging function includes a treatment barrel, a discharge port set at the bottom of the treatment barrel, and a discharge mechanism set at the discharge port. The discharge mechanism includes a discharge bin fixedly connected in the discharge port, provided with an auxiliary member at an end connected to the treatment barrel; the auxiliary member includes a flip shaft fixedly provided with an auxiliary plate extending into the treatment barrel, the flip shaft is connected to the inner wall of the discharge bin with torsion springs, when the device is not in use, the auxiliary plate being tilted downward from outside to inside along the radial direction of the treatment barrel by the action of the torsion springs. The treatment barrel is provided with an abutting assembly at the bottom of the treatment barrel, being capable of intermittently abutting with the auxiliary plate.

7 Claims, 5 Drawing Sheets

(51) Int. Cl.
*B09B 3/35* (2022.01)
*B09B 101/65* (2022.01)

(58) Field of Classification Search
CPC ... B02C 18/16; B02C 18/162; B02C 2018/16; B09B 2101/65
See application file for complete search history.

(56) References Cited

U.S. PATENT DOCUMENTS

| | | | | |
|---|---|---|---|---|
| 4,971,261 | A * | 11/1990 | Solomons | A61M 5/3278 241/606 |
| 4,979,683 | A * | 12/1990 | Busdeker | B02C 19/0075 241/37.5 |
| 5,096,128 | A * | 3/1992 | Chang | B02C 19/0075 241/242 |
| 5,397,068 | A * | 3/1995 | Solomons | B02C 19/0075 241/37.5 |
| 5,516,052 | A * | 5/1996 | Adams | A61B 50/13 241/606 |
| 2012/0314533 | A1* | 12/2012 | Wang | B01F 27/1123 366/292 |
| 2017/0107710 | A1* | 4/2017 | Terrazas | E03D 9/10 |
| 2019/0336805 | A1* | 11/2019 | Casas-Ganem | A62D 3/33 |
| 2022/0203373 | A1* | 6/2022 | Ghirardi | B02C 18/0084 |

FOREIGN PATENT DOCUMENTS

| | | | | |
|---|---|---|---|---|
| CN | 212663765 U | * | 3/2021 | B02C 18/18 |
| CN | 113522472 A | * | 10/2021 | B02C 18/12 |
| CN | 114504863 A | * | 5/2022 | B02C 18/18 |
| CN | 114762840 A | * | 7/2022 | B02C 18/18 |
| CN | 115193866 A | * | 10/2022 | A61L 11/00 |
| CN | 115350762 A | * | 11/2022 | B02C 18/18 |
| CN | 218048114 U | * | 12/2022 | B02C 19/0075 |
| JP | 02098355 A | * | 4/1990 | B02C 19/0075 |

* cited by examiner

MEDICAL WASTE TREATMENT MACHINE WITH ANTI-CLOGGING FUNCTION

CROSS-REFERENCE TO RELATED APPLICATIONS

The present application is a continuation of International Application No. PCT/CN2022/140942, filed on Dec. 22, 2022, which claims priority to Chinese Patent Application No. 202111395770.7, filed on Nov. 23, 2021. The disclosures of the above-mentioned applications are incorporated herein by reference in their entireties.

TECHNICAL FIELD

The present application relates to the field of medical recycling equipment, specifically, to a medical waste treatment machine with anti-clogging function.

BACKGROUND

With the progress of medical technology and science and technology, nowadays the level of medical treatment is more and more mature, nowadays many scientific and technological machines are constantly put into the field of medical health, and medical instruments and equipment are increasing rapidly. The use of medical cabinets will produce medical waste after being used. Medical waste refers to contaminated waste produced by hospitals that has been in contact with patients' blood, flesh, etc. If handled improperly, it will cause serious environmental pollution and may become a source of epidemic diseases. Therefore, it is necessary to recycle and dispose of medical waste after use.

The existing medical waste treatment equipment is very heavy and discharges a lot of material, and the medical waste will be heated and disinfected during treatment, and the crushed medical waste will easily produce the phenomenon of adhesion, which will easily block the discharge port when discharging and thus will affect the working efficiency. Therefore, it is urgent to design a medical waste treatment machine to prevent the discharge port from being blocked.

SUMMARY

The purpose of the present application is to provide a medical treatment machine with anti-clogging function of the discharge port to address the problem that the crushed medical waste in the prior art is prone to stick and easily blocking the discharge port when discharging.

To achieve the above purpose, the technical solution adopted by the present application is as follows.

A medical waste treatment machine with anti-clogging function comprises a treatment barrel, a discharge port provided at a bottom edge of the treatment barrel, and a discharge mechanism provided at the discharge port.

The discharge mechanism includes a discharge bin fixedly connected in the discharge port, the discharge bin is provided with an auxiliary member at an end connected to the treatment barrel, the auxiliary member includes a flip shaft rotatably connected between a front side wall and a rear side wall of the discharge bin, the flip shaft is fixedly provided with an auxiliary plate, the auxiliary plate extends into the treatment barrel, the auxiliary plate is rounded on its upper edges, a torsion spring is connected between the flip shaft and an inner wall of the discharge bin, so that when the device is not in use, the auxiliary plate is tilted downward from outside to inside along the radial direction of the treatment barrel by the action of the torsion springs.

Further, the treatment barrel is provided with an abutting assembly at a bottom of the treatment barrel, and the abutting assembly is capable of intermittently abutting with the auxiliary plate.

Preferably, the abutting assembly includes an integrated cutting tool provided at the bottom of the treatment barrel, the integrated cutting tool includes a mounting block in a shape of truncated square pyramid, each bevel of the mounting block has a cutter provided on, each cutter is in a plane parallel to the corresponding bevel of the mounting block; the mounting block has a power chamber with a downward opening, the power chamber has a power member, the input ends of the cutters extend into the power chamber and are connected to the output end of the power member, and a rotating member is connected between the mounting block and the treatment barrel.

Preferably, an end cover is provided at the top of the treatment barrel, one end of the end cover is hinged to the treatment barrel by an articulating block, and the other end of the end cover is connected to the treatment barrel by a snap. When need to put medical waste into the treatment barrel, the snap is opened, the end cover is opened and then medical waste is put in, after which the end cover is closed and the snap is closed.

Preferably, the power member includes a motor fixedly mounted at the bottom of the treatment barrel, with the output end of the motor extending upwardly through the treatment barrel into the power chamber, the output end of the motor is connected to a gear box by transmission, the gear box is connected to the input ends of the cutters.

Preferably, each cutter includes a rotation shaft rotatably attached to the mounting block, the rotation shaft axis is perpendicular to the corresponding bevel of the mounting block, the rotation shaft has a crushing knife fixedly set on it, the rotation shaft extends through the mounting block into the power chamber, and is connected to the gear box.

Preferably, the rotating member includes an annular electromagnetic sliding chute provided at the bottom of the treatment barrel, two symmetrically provided electromagnetic sliders are slidably connected in the electromagnetic sliding chute; the electromagnetic sliders extend upward into the power chamber; the two electromagnetic sliders have a fixed ring fixedly connected at their upper ends, the fixed ring has four fixed rods fixedly connected evenly along the circumference, and the fixed rods are fixedly connected to the mounting block.

Preferably, a push plate is fixedly connected to a corner of the mounting block, the treatment barrel is cylindrical, the push plate is perpendicular to the inner wall of the treatment barrel, and the push plate is connected against the inner wall of the treatment barrel.

Preferably, the discharge mechanism further includes an opening and closing plate provided at an end of the discharge bin away from the discharge port for closing the discharge bin, an upper part of the opening and closing plate is hinged with an upper part of the discharge bin, the discharge bin has two electric telescopic rods provided symmetrically at the front and rear sides, with one ends of the electric telescopic rods being hinged to the opening and closing plate and the other ends of the electric telescopic rods being hinged to the treatment barrel.

The advantage of the present application is as follow.

By the setting of the auxiliary plate and the abutting assembly, so that during discharging, the abutting assembly abuts with the auxiliary plate, causing the auxiliary plate to flip downward, pushing out the crushed medical waste through the discharge bin, preventing clogging of the discharge bin, and improving the efficiency of discharging.

DETAILED DESCRIPTION OF THE EMBODIMENTS

The specific embodiments provided by the present application are described in detail below in conjunction with the accompanying drawings.

The present application will be described in detail in the following in connection with the accompanying FIGS. 1 to 6 to provide a clear and complete description of the technical solutions in the embodiments of the present application. Obviously, the described embodiments are only a part of the embodiments of the present application, and not all of them. Based on the embodiments in the present application, all other embodiments obtained by a person of ordinary skill in the art without making creative labor fall within the scope of protection of the present application.

Figure 1:
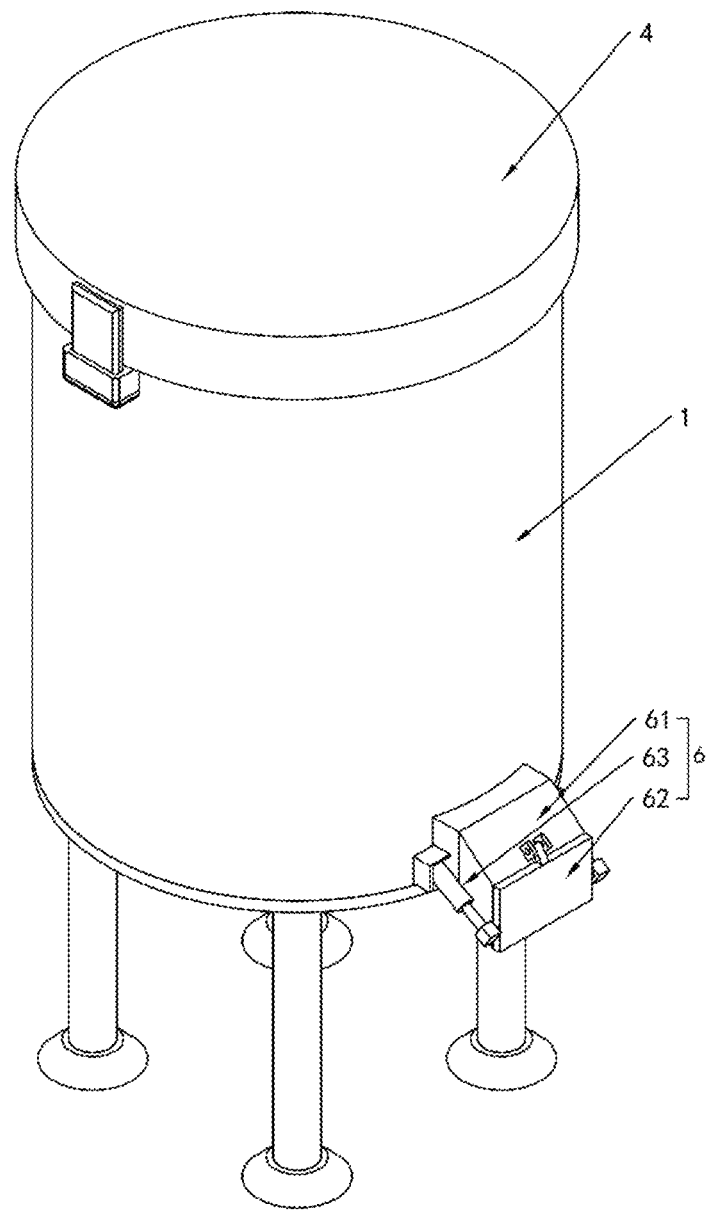
FIG. 1 is a three-dimensional view of the present application.
Figure 2:
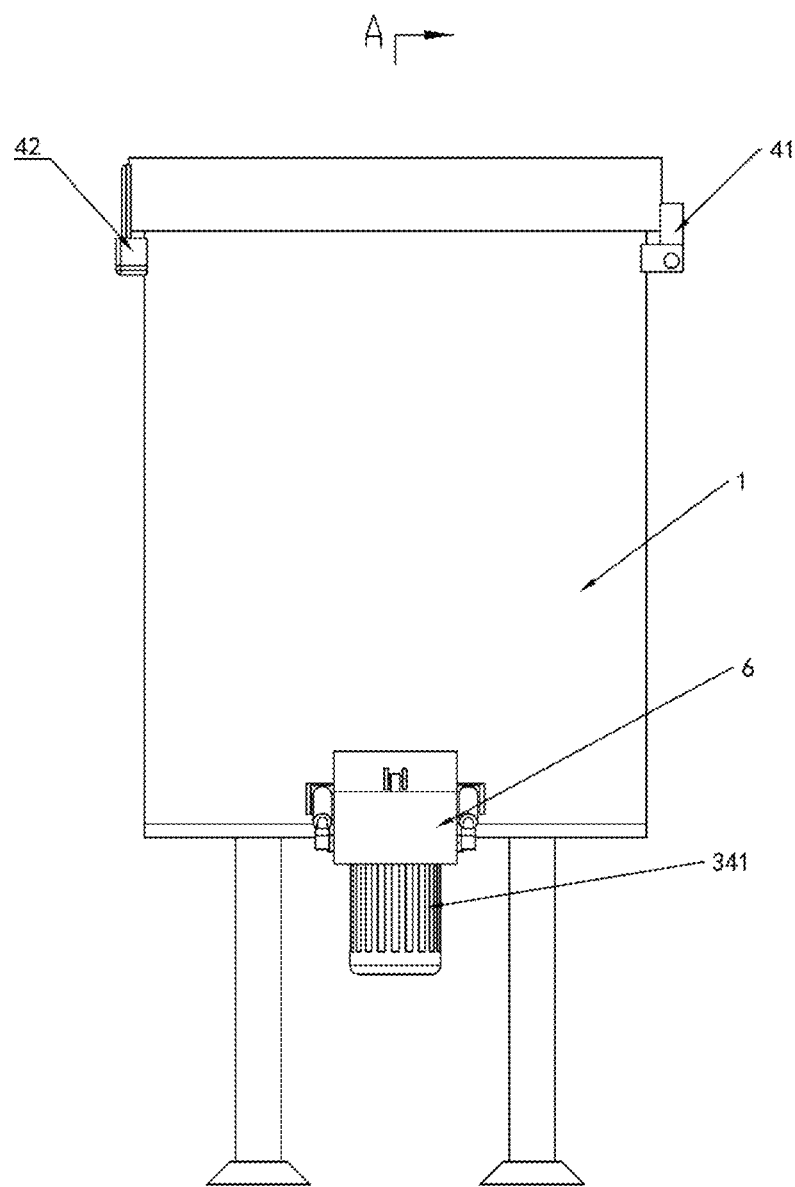
FIG. 2 is a front view of the present application.
Figure 3:
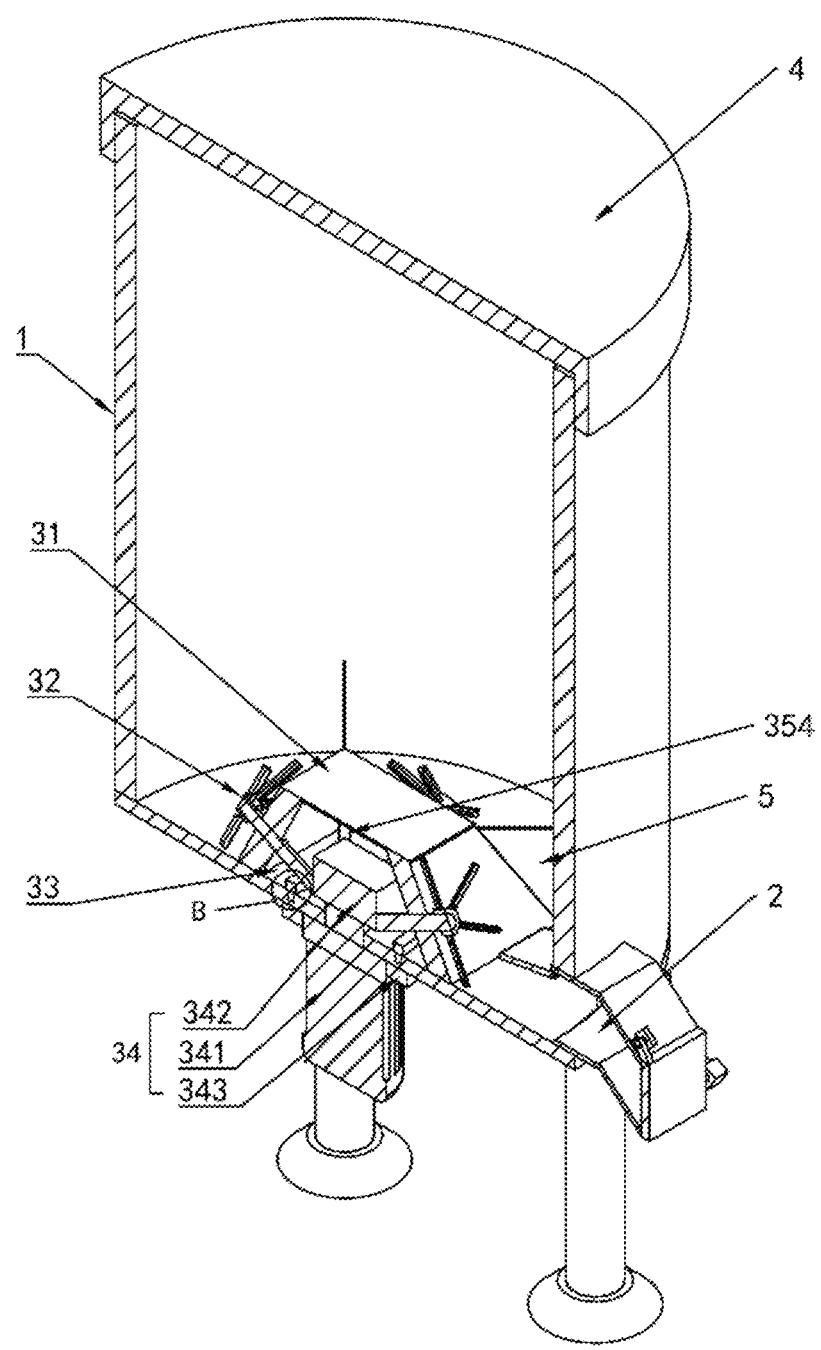
FIG. 3 is an isometric side sectional view of the present application at A-A in FIG. 2.

As shown in FIGS. 1 to 3, the present application proposes a medical waste treatment machine with anti-clogging function, includes a treatment barrel 1, a discharge port 2 set at the bottom of the treatment barrel 1, and a discharge mechanism 6 set at the discharge port 2.

The discharge mechanism 6 includes a discharge bin 61 fixedly connected in the discharge port 2, the discharge bin 61 is provided with an auxiliary member 64 at the end that is connected to the treatment barrel 1, the auxiliary member 64 includes a flip shaft 641 rotatably connected between the front and rear side walls of the discharge bin 61, the flip shaft 641 is fixedly provided with an auxiliary plate 642 extending into the treatment barrel 1, the auxiliary plate 642 is rounded at the upper side edges, the flip shaft 641 is connected to the inner wall of the discharge bin 61 with a torsion spring 643, when the device is not in use, the auxiliary plate 642 is tilted downward from outside to inside along the radial direction of the treatment barrel 1 by the action of the torsion springs 643.

Further, the treatment barrel 1 is provided with an abutting assembly at the bottom of the treatment barrel 1, the abutting assembly is capable of intermittently abutting with the auxiliary plate 642.

Preferably, the abutting assembly includes an integrated cutting tool 3 provided at the bottom of the treatment barrel 1, the integrated cutting tool 3 comprising a mounting block 31 in a shape of truncated square pyramid, the mounting block having a cutter on each bevel, each cutter 32 is in a plane parallel to the corresponding bevel of the mounting block, the mounting block having a power chamber 33 with a downward opening, the power chamber 33 having a power member 34, the input end of the cutter extends into the power chamber 33 and is connected to the output end of the power member 34, and a rotating member 35 is connected between the mounting block and the treatment barrel 1.

The medical waste is crushed by means of cutters 32 set on the inclined surface of the mounting block 31, and because the plane where the cutter 32 are located is at an angle to the ground of the treatment barrel 1, it makes the cutter 32 bounce off the metal in the medical waste when they come in contact with it, after which the metal remains at the bottom of the treatment barrel 1 due to gravity, which reduces the contact area between the cutters and the metal in direct contact with the metal and reduces the cutters' wear rate compared to the cutters in the prior art that are parallel to the bottom surface of the treatment barrel setting, in the meanwhile the four cutters 32 are distributed in a conical shape, which has a strong tearing force when dealing with longer waste and improves the crushing efficiency, and by the setting of the rotating member 35, when the material needs to be discharged, the rotating member 35 is activated, which causes the rotating member 35 to drive the mounting block 31 to rotate, and the cutter 32 on the mounting block 31 rotates accordingly, and at the same time with the cutter 32 rotating itself, it makes it easier for the crushed medical waste to be discharged from the discharge port 2, reducing the accumulation of waste in the treatment barrel 1, and at the same time when the mounting block 31 rotates, the four corners of the mounting block 31 push the waste to the outside, making it discharged from the discharge port 2.

As shown in FIG. 1, an end cover 4 is provided at the top of the treatment barrel 1, with one end of the end cover 4 being hinged to the treatment barrel 1 by an articulating block 41, and the other end of the end cover 4 being connected to the treatment barrel 1 by a snap 42. When need to put medical waste into the treatment barrel 1, the snap 42 is opened, the end cover 4 is opened and medical waste is put in, after which the end cover 4 is closed and the snap 42 is closed.

By the setting of the end cover 4, it makes the medical waste crushed in the treatment barrel 1 to avoid the residual liquid inside the medical waste from spilling out during crushing and polluting the environment.

As shown in FIG. 3, the power member 34 includes a motor 341 fixedly mounted at the bottom of the treatment barrel 1, with the output end of the motor 341 extending upwardly through the treatment barrel 1 into the power chamber 33, and being connected with a gear box 342 by transmission, the gear box 342 is connected to the input end of the cutter.

The gear box 342 is prior art and will not be repeated.

As shown in FIG. 3, the cutter includes a rotation shaft 321 rotatably attached to the mounting block, the axis of the rotation shaft 321 is perpendicular to the corresponding bevel of the mounting block, the rotation shaft 321 has a crushing knife fixedly set on it, the rotation shaft 321 extends through the mounting block into the power chamber 33, and is connected to the gear box 342.

By the plane where the cutter 32 is located at an angle to the ground of the treatment barrel 1, so that when the cutter 32 comes into contact with the metal in the medical waste, it causes the metal to be bounced off, after which the metal remains at the bottom of the treatment barrel 1 due to gravity, reducing the contact area of the tool in direct contact with the metal and reducing the rate of cutter wear compared to the existing setting where the cutter is parallel to the bottom of the treatment barrel.

Figure 4:
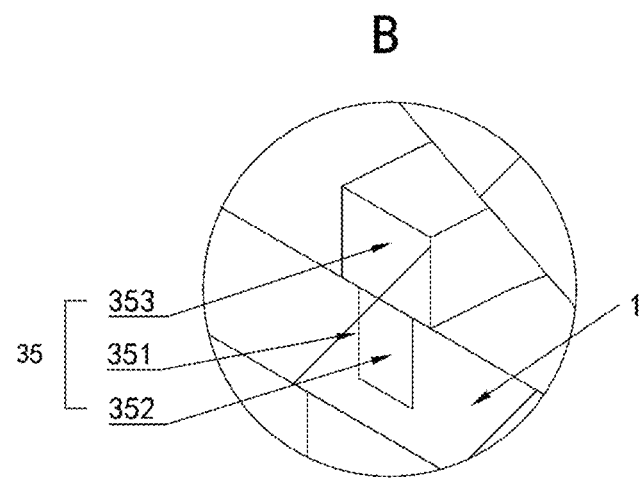
FIG. 4 is a partial enlarged view at B in FIG. 3 of the present application.

As shown in FIGS. 3 and 4, the rotating member includes an annular electromagnetic sliding chute 351 provided at the bottom of the treatment barrel 1, two symmetrically provided electromagnetic sliders 352 slidingly connected in the electromagnetic sliding chute 351, extending upward into the power chamber 33; the two electromagnetic sliders 352 have a fixed ring 353 fixedly connected at their upper end, the fixed ring 353 has four fixed rods 354 fixedly connected evenly along the circumference, the fixed rods 354 are fixedly connected to the mounting block.

By the setting of the electromagnetic sliding chute 351 with the electromagnetic slider 352, when the material needs to be discharged, the electromagnetic slider 352 makes a circular movement in the annular electromagnetic sliding chute 351, thus driving the mounting block 31 to rotate through the fixing ring 353 as well as the fixing rod 354 to facilitate discharging.

Figure 5:
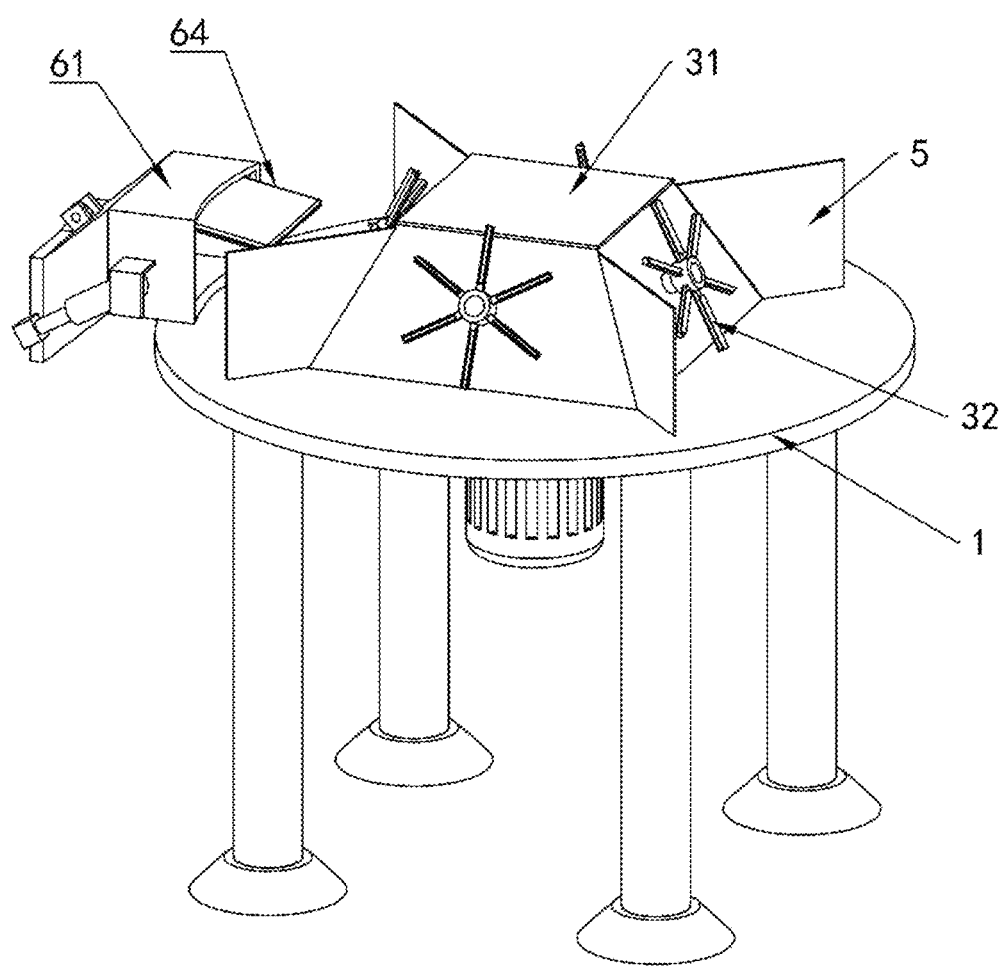
FIG. 5 is a schematic diagram of the structure of the integrated cutting tool of the present application.
Figure 6:
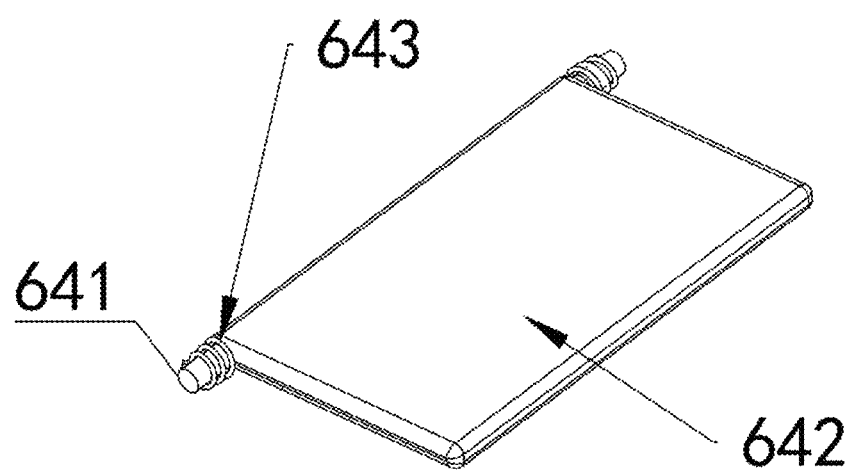
FIG. 6 is a schematic diagram of the structure of the auxiliary member of the present application.

As shown in FIGS. 3 and 5, a push plate 5 is fixedly connected to the corner of the mounting block, the treatment barrel 1 is cylindrical, the push plate 5 is perpendicular to the inner wall of the treatment barrel 1, and the push plate 5 is connected against the inner wall of the treatment barrel 1.

By the setting of the push plate 5, when the mounting block 31 is rotated, the mounting block 31 drives the push plate 5 to rotate to facilitate discharging.

As shown in FIGS. 1 and 3, the discharge mechanism 6 further includes an opening and closing plate 62 provided at an end of the discharge bin 61 away from the discharge port 2 for closing the discharge bin 61, the upper part of the opening and closing plate 62 is hinged with the upper part of the discharge bin 61, the discharge bin 61 has two electric telescopic rods 63 provided symmetrically at the front and rear sides, one end of each electric telescopic rod 63 is hinged to the opening and closing plate 62 and the other end of the electric telescopic rod 63 is hinged to the treatment barrel 1.

With the electric telescopic rod 63 being provided, when discharging is required, the electric telescopic rod 63 is activated, causing the electric telescopic rod 63 to elongate, thereby driving the opening and closing plate 62 to flip over, causing the discharge bin 61 to open, facilitating discharging.

The motor 341 is fixedly provided with a mounting ring 343, and the mounting ring 343 is bolted to the bottom of the treatment barrel 1.

The above described is only preferred embodiments of the present application, and it should be noted that for a person of ordinary skill in the art, several improvements and additions can be made without departing from the method of the present application, and these improvements and additions should also be considered as the scope of protection of the present application.

What is claimed is:

1. A medical waste treatment machine with anti-clogging function, comprising a treatment barrel, a discharge port set at the bottom of the treatment barrel, and a discharge mechanism set at the discharge port; wherein
    the discharge mechanism comprises a discharge bin fixedly connected in the discharge port, the discharge bin is provided with an auxiliary member at an end connected to the treatment barrel, the auxiliary member comprises a flip shaft rotatably connected between a front side wall and a rear side wall of the discharge bin; the flip shaft is fixedly provided with an auxiliary plate, the auxiliary plate extends into the treatment barrel, the auxiliary plate is rounded at its upper edges, and torsion springs are connected between the flip shaft and an inner wall of the discharge bin, so that when the device is not in use, the auxiliary plate is tilted downward from outside to inside along the radial direction of the treatment barrel by the action of the torsion springs;
    the treatment barrel is provided with an abutting assembly at a bottom of the treatment barrel, and the abutting assembly is capable of intermittently abuts with the auxiliary plate; and
    the abutting assembly comprises an integrated cutting tool provided at the bottom of the treatment barrel, the integrated cutting tool comprises a mounting block in a shape of truncated square pyramid, each bevel of the mounting block has a cutter provided on, each cutter is in a plane parallel to the corresponding bevel of the mounting block; the mounting block has a power chamber with a downward opening, the power chamber has a power member, the input ends of the cutters extend into the power chamber and are connected to the output end of the power member, and a rotating member is connected between the mounting block and the treatment barrel.

2. The medical waste treatment machine with anti-clogging function according to claim 1, wherein an end cover is provided at the top of the treatment barrel, one end of the end cover is hinged to the treatment barrel by an articulating block, and the other end of the end cover is connected to the treatment barrel by a snap; when need to put medical waste into the treatment barrel, the snap is opened, the end cover is opened and the medical waste is put in, then the end cover is closed and the snap is closed.

3. The medical waste treatment machine with anti-clogging function according to claim 1, wherein the power member comprises a motor fixedly mounted at the bottom of the treatment barrel, with the output end of the motor extending upwardly through the treatment barrel into the power chamber, the output end of the motor is connected to a gear box by transmission, the gear box is connected to the input ends of the cutters.

4. The medical waste treatment machine with anti-clogging function according to claim 3, wherein the cutter comprises a rotation shaft rotatably attached to the mounting block, the rotation shaft axis is perpendicular to the corresponding bevel of the mounting block, the rotation shaft has a crushing knife fixedly set on it, the rotation shaft extends through the mounting block into the power chamber, and is connected to the gear box.

5. The medical waste treatment machine with anti-clogging function according to claim 1, wherein the rotating member comprises an annular electromagnetic sliding chute provided at the bottom of the treatment barrel, two symmetrically provided electromagnetic sliders are slidably connected in the electromagnetic sliding chute, and are extending upward into the power chamber; the two electromagnetic sliders have a fixed ring fixedly connected at their upper ends, the fixed ring has four fixed rods fixedly connected evenly along the circumference, and the fixed rods are fixedly connected to the mounting block.

6. The medical waste treatment machine with anti-clogging function according to claim 1, wherein a push plate is fixedly connected to a corner of the mounting block, the treatment barrel is cylindrical, the push plate is perpendicular to an inner wall of the treatment barrel, and the push plate is connected against the inner wall of the treatment barrel.

7. The medical waste treatment machine with anti-clogging function according to claim 1, wherein the discharge mechanism further comprises an opening and closing plate provided at an end of the discharge bin away from the discharge port for closing the discharge bin, an upper part of the opening and closing plate is hinged with an upper part of the discharge bin, the discharge bin has two electric telescopic rods provided symmetrically at the front and rear sides, and one end of each electric telescopic rod is hinged to the opening and closing plate, the other end of the electric telescopic rod is hinged to the treatment barrel.

* * * * *